United States Patent
Yu et al.

(10) Patent No.: US 11,994,961 B2
(45) Date of Patent: May 28, 2024

(54) IMAGE DISPLAY SYSTEM, IMAGE PROCESSOR CIRCUIT, AND PANEL DRIVING METHOD

(71) Applicant: REALTEK SEMICONDUCTOR CORPORATION, Hsinchu (TW)

(72) Inventors: Chia-Wei Yu, Hsinchu (TW); Chun-Hsing Hsieh, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 136 days.

(21) Appl. No.: 17/536,138

(22) Filed: Nov. 29, 2021

(65) Prior Publication Data
US 2022/0292003 A1 Sep. 15, 2022

(30) Foreign Application Priority Data
Mar. 15, 2021 (TW) .................. 110109136

(51) Int. Cl.
G09G 5/00 (2006.01)
G06F 11/10 (2006.01)
G06F 11/16 (2006.01)
G09G 3/00 (2006.01)
G09G 5/02 (2006.01)

(52) U.S. Cl.
CPC ........ *G06F 11/162* (2013.01); *G06F 11/1004* (2013.01); *G09G 3/006* (2013.01); *G09G 5/022* (2013.01); *G09G 2360/127* (2013.01); *G09G 2360/18* (2013.01)

(58) Field of Classification Search
CPC ... G06F 11/162; G06F 11/1004; G09G 3/006; G09G 5/022; G09G 5/02
USPC .......................................................... 345/618
See application file for complete search history.

(56) References Cited

U.S. PATENT DOCUMENTS

| | | | | |
|---|---|---|---|---|
| 2007/0075957 A1* | 4/2007 | Chen | .................... | G09G 3/3685 345/98 |
| 2011/0254822 A1* | 10/2011 | Anzai | .................... | G09G 3/006 345/204 |
| 2019/0200977 A1* | 7/2019 | Shelton, IV | ......... | A61B 17/068 |

FOREIGN PATENT DOCUMENTS

CN 109388345 A 2/2019

OTHER PUBLICATIONS

OA letter of the counterpart TW application (appl. No. 110109136) mailed on Feb. 14, 2022.

* cited by examiner

*Primary Examiner* — Gordon G Liu
(74) *Attorney, Agent, or Firm* — WPAT, P.C

(57) ABSTRACT

An image display system includes a display device, a second memory circuit, and an image processor circuit. The display device includes a panel and a first memory circuit, in which the first memory circuit is configured to store first predetermined data for controlling the panel. The second memory circuit is configured to store second predetermined data. The image processor circuit is configured to read first part data in the first predetermined data and second part data in the second predetermined data and compare the first part data with the second part data. If the first part data is identical to the second part data, the image processor circuit is further configured to output a driving signal according to the second predetermined data to control the panel to start displaying an image.

18 Claims, 4 Drawing Sheets

100

IMAGE DISPLAY SYSTEM, IMAGE PROCESSOR CIRCUIT, AND PANEL DRIVING METHOD

BACKGROUND OF THE INVENTION

1. Field of the Invention

The present disclosure relates to an image display system. More particularly, the present disclosure relates to an image display system, an image processor circuit, and a panel driving method that are able to shorten the time for a panel starting to display image(s).

2. Description of Related Art

In the existing TV system, in order to make a specific panel have a better display effect, an image processing chip is required to read relevant information about the specific panel from a display device, and execute corresponding image processing procedures to control the panel based on the information. However, as the display device and the image processing chip usually exchange data through a low-speed transmission interface, if the image processing chip needs to read complete relevant information after every boot procedure, the time for the panel to start displaying image(s) will be delayed, which results in a poor user experience.

SUMMARY OF THE INVENTION

In some aspects of the present disclosure, an image display system includes a display device, a second memory circuit, and an image processor circuit. The display device includes a panel and a first memory circuit, in which the first memory circuit is configured to store first predetermined data for controlling the panel. The second memory circuit is configured to store second predetermined data. The image processor circuit is configured to read first part data in the first predetermined data and second part data in the second predetermined data and compare the first part data with the second part data. If the first part data is identical to the second part data, the image processor circuit is further configured to output a driving signal according to the second predetermined data to control the panel to start displaying an image.

In some aspects of the present disclosure, an image processor circuit includes a memory circuit and at least one processor circuit. The memory circuit is configured to store at least one program code. The at least one processor circuit is configured to execute the at least one program code to: read first part data in first predetermined data from a first memory circuit of a display device, and read second part data in second predetermined data from a second memory circuit; compare the first part data with the second part data; and if the first part data is identical to the second part data, output a driving signal according to the second predetermined data to control a panel of the display device to start displaying an image.

In some aspects of the present disclosure, a panel driving method includes the following operations: reading first part data in first predetermined data from a first memory circuit of a display device, and reading second part data in second predetermined data from a second memory circuit; comparing the first part data with the second part data; and if the first part data is identical to the second part data, outputting a driving signal according to the second predetermined data to control a panel of the display device to start displaying an image.

These and other objectives of the present disclosure will be described in preferred embodiments with various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
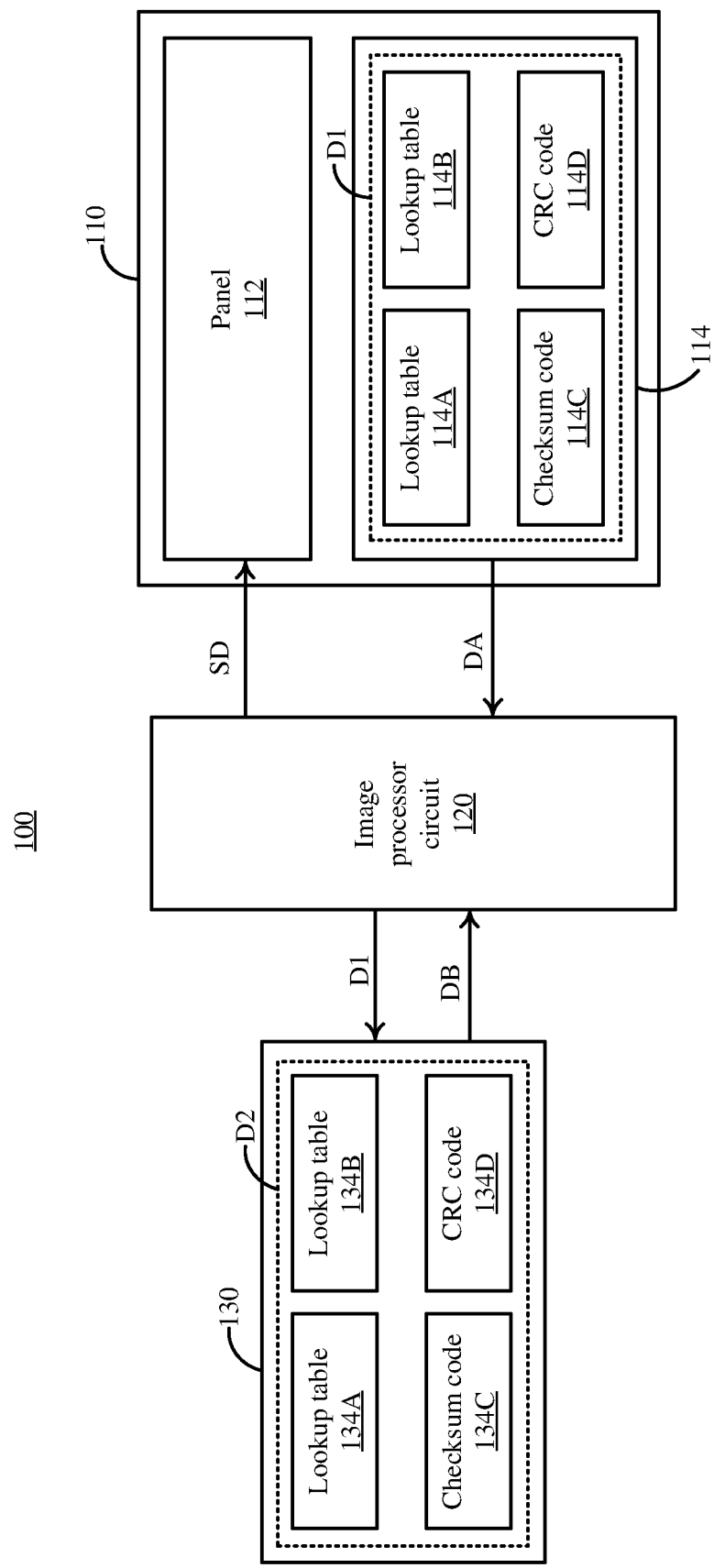
FIG. 1 is a schematic diagram of an image display system according to some embodiments of the present disclosure.

FIG. 1 is a schematic diagram of an image display system 100 according to some embodiments of the present disclosure. In some embodiments, the image display system 100 may be a television, but the present disclosure is not limited thereto. The image display system 100 may be various electronic devices having a monitor.

The image display system 100 includes a display device 110, an image processor circuit 120, and a memory circuit 130. The display device 110 is configured to display an image based on a control of the image processor circuit 120. The display device 110 includes a panel 112 and a memory circuit 114. The panel 112 may display the image according to a driving signal SD. In different embodiments, the panel 112 may be, but not limited to, a backlight panel or a light emitting diode (LED) panel. The backlight panel includes, but not limited to, a twisted nematic panel, a super twisted nematic panel, or a thin film transistor panel. The panel using LED(s) include a micro LED panel, a mini LED panel, an OLED panel. The types of the panel 112 are given for illustrative purposes, and the present disclosure is not limited thereto.

Figure 3A:
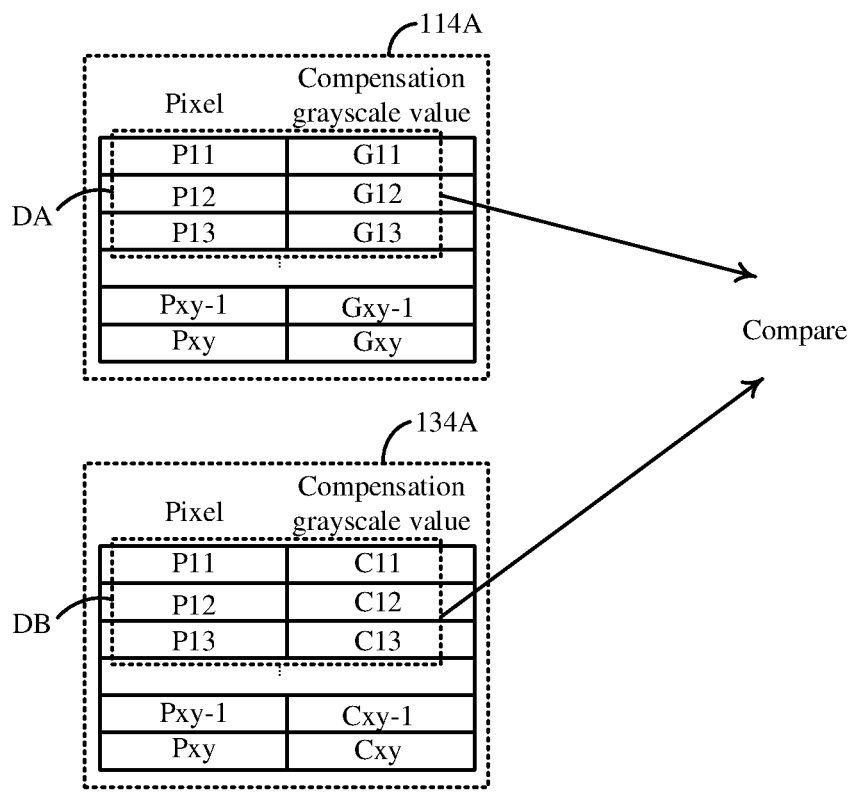
FIG. 3A is a schematic diagram of the lookup tables in FIG. 1 according to some embodiments of the present disclosure.
Figure 3B:
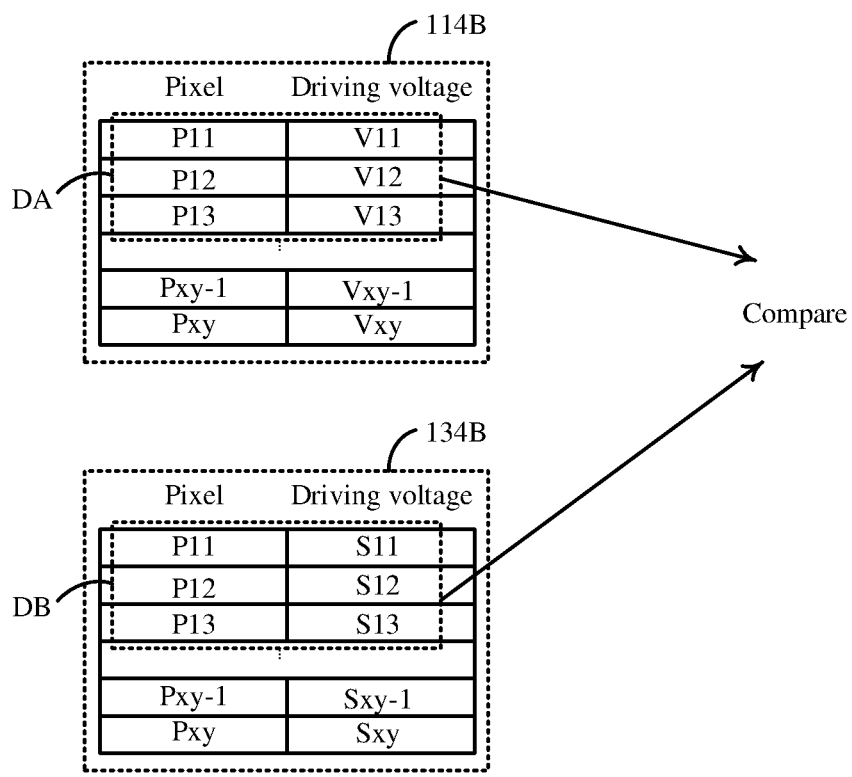
FIG. 3B is a schematic diagram of the lookup tables in FIG. 1 according to some embodiments of the present disclosure.

The memory circuit 114 may be various types of memory circuit, which is configured to store predetermined data D1. For example, the memory circuit 114 may be, but not limited to, a flash memory circuit. In some embodiments, the memory circuit 114 may be a flash memory that employs a serial peripheral interface (SPI). The predetermined data D1 includes image compensation parameter data and/or error detection data for controlling the panel 112. For example, the image compensation parameter data may include, but not limited thereto, a lookup table 114A for adjusting (i.e., calibrating) pixel values (which may be, but not limited to, grayscale values, chroma values, RGB values, RGBW values, and so on, and thus compensation grayscale values discussed in the following embodiments can be replaced correspondingly) of the panel 112 and/or a lookup table 114B for improving a response time of the panel 112. For example, as shown in FIG. 3A, the lookup table 114A stores compensation grayscale values corresponding to pixels, which can be employed to perform a demura process on the panel 112. In other examples, as shown in FIG. 3B, the lookup table 114B store values of driving voltages corresponding to the pixels, which can be employed to over-drive the corresponding pixels in the panel 112, in order to adjust (i.e., improve) the response time the panel 112. In some embodiments, the error detection data may be employed to verify data integrity of the predetermined data D1. The error correction data may be generated in advance based on a data error detection algorithm and complete the predetermined data D1. For example, the error detection data may include a checksum code 114C and/or a cyclic redundancy check (CRC) code 114D. In some embodiments, the error detection data may be replaced with a product serial number of the panel 112.

It is understood that, in some other embodiments, the lookup table 114A and the lookup table 114B in the predetermined data D1 may be implemented with at least one (i.e., one or more) lookup table. Similarly, in some other embodiments, the lookup table 134A and the lookup table 134B in the predetermined data D2 may be implemented with at least one lookup table as well.

The types of the image compensation parameter data and/or the error detection data are given for illustrative purposes, and the present disclosure is not limited thereto. Various image compensation parameter data associated with the panel 112 and various error detection data able to verify the data integrity are within the contemplated scope of the present disclosure.

The memory circuit 130 is coupled to the image processor circuit 120 and is configured to store predetermined data D2. In some embodiments, the predetermined data D2 may be predetermined data (e.g., the predetermined data D1) that is received by the image processor circuit 120 from the display device 110 (or other display device(s)) in a previous operation. In other words, the predetermined data D2 may include image compensation parameter data and/or the error detection data corresponding to the predetermined data D1. For example, the predetermined data D2 includes a lookup table 134A corresponding to the lookup table 114A, a lookup table 134B corresponding to the lookup table 114B, a checksum code 134C corresponding to the checksum code 114C, and a CRC code 134D corresponding to the CRC code 114D, but the present disclosure is not limited thereto. In some embodiments, the memory circuit 130 may be various types of memory circuit. For example, the memory circuit 130 may be, but not limited to, a flash memory circuit. In some embodiments, the memory circuit 130 may be an embedded multimedia card (emmc). In some embodiments, a data transfer rate (e.g., a data transfer rate met with an emmc standard) between the memory circuit 130 and the image processor circuit 120 is faster than a data transfer rate (e.g., a transfer rate of a SPI) between the memory circuit 114 and the image processor circuit 120.

Figure 2:
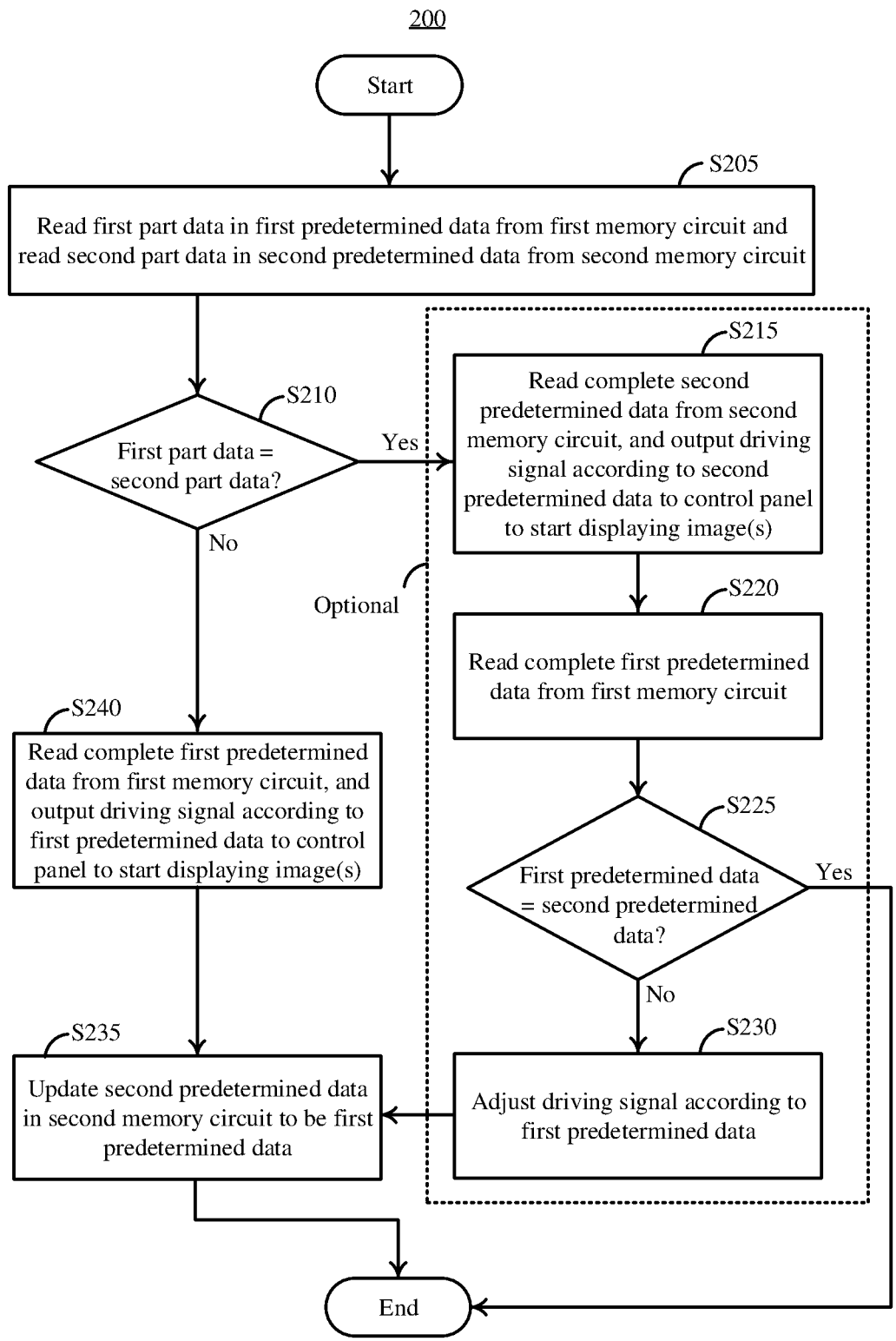
FIG. 2 is a flowchart of a panel driving method according to some embodiments of the present disclosure.

The image processor circuit 120 is configured to read part data DA in the predetermined data D1 from the memory circuit 114 and read part data DB in the predetermined data D2 from the memory circuit 114, in order to perform operations in FIG. 2. As a result, the image processor circuit 120 is able to generate the driving signal SD to drive the panel 112 to start displaying image(s). Operations regarding herein will be described with reference to FIG. 2. In some embodiments, the image processor circuit 120 may be, but not limited to, an image processing chip.

FIG. 2 is a flowchart of a panel driving method 200 according to some embodiments of the present disclosure. In some embodiments, the panel driving method 200 may be, but not limited to, performed by the image processor circuit 120 in FIG. 1.

In operation S205, first part data in first predetermined data is read from a first memory circuit, and second part data in second predetermined data is read from a second memory circuit. In operation S210, the first part data and the second part data are compared with each other. If the first part data is identical to the second part data, operation S215 is performed. Alternatively, if the first part is different from the second part data, operation S240 is performed.

For ease of understanding operations S205 and S210, reference is made to FIG. 3A and FIG. 3B. FIG. 3A is a schematic diagram of the lookup table 114A and the lookup table 134A in FIG. 1 according to some embodiments of the present disclosure, and FIG. 3B is a schematic diagram of the lookup table 114B and the lookup table 134B in FIG. 1 according to some embodiments of the present disclosure.

As shown in FIG. 3A, the lookup table 114A is for calibrating grayscale values of pixels in the panel 112. The lookup table 114A includes multiple data which indicate corresponding relationships between pixels P11-Pxy and compensation grayscale values G11-Gxy, in which each of x and y is a positive integer greater than 1. In operation S205, after the image processor circuit 120 is booted, the image processor circuit 120 may read the first three data in the lookup table 114A from the memory circuit 114 to be the part data DA, but the present disclosure is not limited thereto. In other words, the part data DA is not the complete predetermined data D1. Corresponding to the lookup table 114A, the lookup table 114B includes multiple data, which indicate corresponding relations between the pixels P11-Pxy and the compensation grayscale values C11-Cxy. Similarly, in operation S205, after the image processor circuit 120 is booted, the image processor circuit 120 may read the first three data in the lookup table 134A from the memory circuit 130 to be the part data DB, but the present disclosure is not limited thereto. In other words, the part data DB is not the complete predetermined data D2. As a result, the image processor circuit 120 may compare the part data DA with the part data DB. If the part data DA is identical to the part data DB (e.g., the compensation grayscale values G11, G12, and G13 are identical to the compensation grayscale values C11, C12, and C13, respectively), the image processor circuit 120 performs operation S215. Alternatively, if the part data DA is different from the part data DB, the image processor circuit 120 performs operation S240.

Similarly, as shown in FIG. 3B, the lookup table 114B is for calibrating driving voltages for pixels in the panel 112. The lookup table 114B includes multiple data, which indicate corresponding relations between the pixels P11-Pxy and values of driving voltages V11-Vxy. In operation S205, the image processor circuit 120 may read the first three data in the lookup table 114B from the memory circuit 114 to be the part data DA, but the present disclosure is not limited thereto. Corresponding to the lookup table 114B, the lookup table 134B includes multiple data, which indicate corresponding relations between the pixels P11-Pxy and values of driving voltages S11-Sxy. Similarly, in operation S205, the image processor circuit 120 may read the first three data in the lookup table 134B from the memory circuit 130 to be the part data DB, but the present disclosure is not limited thereto. If the part data DA is identical to the part data DB (e.g., values of the driving voltages V11, V12, and V13 are the same as those of the driving voltages S11, S12, and S13, respectively), the image processor circuit 120 performs operation S215. Alternatively, if the part data DA is different from the part data DB, the image processor circuit 120 performs operation S240.

It is understood that, data configurations shown in FIG. 3A and FIG. 3B are given for illustrative purposes, and the present disclosure is not limited thereto. The part data DA may be at least one data in the lookup table 114A, and data amount of the part data DA is smaller than data amount of the predetermined data D1. The part data DB may be at least one data in the lookup table 134A, and data amount of the part data DB is smaller than data amount of the predetermined data D2. In some embodiments, the part data DA may be stored in any location in the lookup table 114A, and the part data DB may be stored in any location in the lookup table 134A. In some embodiments, the part data DA and the part data DB are data sufficient to light up the panel 112 or key data, but the present disclosure is not limited thereto.

Alternatively, in some other examples, after the image processor circuit 120 is booted, the image processor circuit 120 may read the checksum code 114C in the predetermined data D1 from the memory circuit 114 to be the part data DA, and read the checksum code 134C in the predetermined data D2 from the memory circuit 130 to be the part data DB, and determine whether to perform operation S215 or operation S240 according to the comparison result of the part data DA and the part data DB. Similarly, in some other examples, after the image processor circuit 120 is booted, the image processor circuit 120 may read the CRC code 114D in the predetermined data D1 from the memory circuit 114 to be the part data DA, and read the CRC code 134D in the predetermined data D2 from the memory circuit 130 to be the part data DB, and determine whether to perform operation S215 or operation S240 according to the comparison result of the part data DA and the part data DB.

With continued reference to FIG. 2, in operation S215, the complete second predetermined data is read from the second memory circuit, in order to output a driving signal according to the second predetermined data to control the panel to start displaying images. For example, if the part data DA is identical to the part data DB, it indicates that the predetermined data D1 may be exactly the same as the predetermined data D2. Under this condition, the image processor circuit 120 is able to read the complete predetermined data D2 from the memory circuit 130, and output the corresponding driving signal SD according to the predetermined data D2, in order to control the panel 112 to start displaying image(s). As the display device 110 is commonly to transfer data with the image processor circuit 120 via a low-speed interface (which may be, but not limited to, a serial peripheral interface), a data transfer rate between the memory circuit 130 and the image processor circuit 120 is usually faster than a data transfer rate between the display device 110 and the image processor circuit 120. Therefore, with operations S205, S210, and S215, the image processor circuit 120 is able to read the complete predetermined data D2 from the memory circuit 130 having faster data transfer rate, in order to start outputting the driving signal SD according to the predetermined data D2 to control the panel 112 to display image(s). As a result, a time for the panel 112 being lighted up (i.e., the time for starting to display image(s)) can be brought forward.

In operation S220, the complete first predetermined data is read from the first memory circuit. In operation S225, the first predetermined data is compared with the second predetermined data. If the first predetermined data is different from the second predetermined data, operation S230 is performed. If the first predetermined data is identical to the second predetermined data, the driving signal is continuously outputted according to the second predetermined data to drive the panel. In operation S230, the driving signal is adjusted according to the first predetermined data.

For example, during an interval when the driving signal SD is generated according to the predetermined data D2, the image processor circuit 120 may read the complete predetermined data D1 from the memory circuit 114, and compare the complete predetermined data D1 with the complete predetermined data D2. If the predetermined data D1 is identical to the predetermined data D2, it indicates that the predetermined data D2 previously stored in the memory circuit 130 correspond to data for controlling the panel 112 correctly. Under this condition, the image processor circuit 120 may continue outputting the driving signal SD according to the predetermined data D2 and stop comparing the predetermined data D1 with the predetermined data D2. Alternatively, if the predetermined data D1 is different from the predetermined data D2, it indicates that the predetermined data D2 previously stored in the memory circuit 130 correspond to the data for controlling the panel 112 incorrectly. Under this condition, the image processor circuit 120 adjusts the driving signal SD according to the predetermined data D1, such that the panel 112 is able to display more suitable image(s).

In operation S240, the complete first predetermined data is read from the first memory circuit, and the driving signal is outputted according to the first predetermined data to control the panel to start displaying image(s). For example, if the part data DA is different from the part data DB, it indicates that the predetermined data D2 is image compensation data for controlling another panel (rather than the panel 112). Accordingly, similar to operation S230, the image processor circuit 120 is able to output the driving signal SD according to the complete predetermined data D1, in order to ensure that the panel 112 is able to display more suitable image(s).

In operation S235, the second predetermined data in the second memory circuit is updated to be the first predetermined data. For example, if the predetermined data D1 is different from the predetermined data D2, the image processor circuit 120 may store the predetermined data D1 to the memory circuit 130, in order to update the predetermined data D2 to be the predetermined data D1 (i.e., the predetermined data D2 in the memory circuit 130 is replaced with the predetermined data D1). As a result, in next operation, a time for the panel 112 being lighted up can be brought forward.

In some embodiments, if the part data DA is the error detection data (i.e., the checksum code 114C and/or the CRC code 114D) and the part data DB is the corresponding error detection data (i.e., the checksum code 134C and/or the CRC code 134D), operation S215 to operation S230 may be omitted. As the error detection data is generated based on the complete predetermined data D1 and the data error detection algorithm, the part data DA is sufficient to represent the complete predetermined data D1. Similarly, as the error detection data (i.e., the checksum code 134C and/or the CRC code 134D) is generated based on the complete predetermined data D2 and the data error detection algorithm, the part data DB is sufficient to represent the complete predetermined data D2. Under this condition, if the part data DA is identical to the part data DB, it is sufficient to determine that the predetermined data D1 is the same as the predetermined data D2. The image processor circuit 120 is able to output the driving signal SD according to the predetermined data D2 without comparing the complete predetermined data D2 with the complete predetermined data D1 (i.e., operation S225). In other words, according to types of the part data DA and the part data DB, operation S215 to operation 230 may be optionally employed.

In some embodiments, if the predetermined data D1 includes the error detection data (i.e., the checksum code 134C and/or the CRC code 134D), the error detection data is given high priority for being read by the image processor circuit 120 to be the part data DA.

The above operations can be understood with reference the above embodiments, and thus the repetitious descriptions are not given. The above description of the panel driving method 200 includes exemplary operations, but the operations of the panel driving method 200 are not necessarily performed in the order described above. Operations of the panel driving method 200 can be added, replaced, changed order, and/or eliminated, or the operations of the panel driving method 200 can be executed simultaneously or partially simultaneously as appropriate, in accordance with the spirit and scope of various embodiments of the present disclosure.

Figure 4:
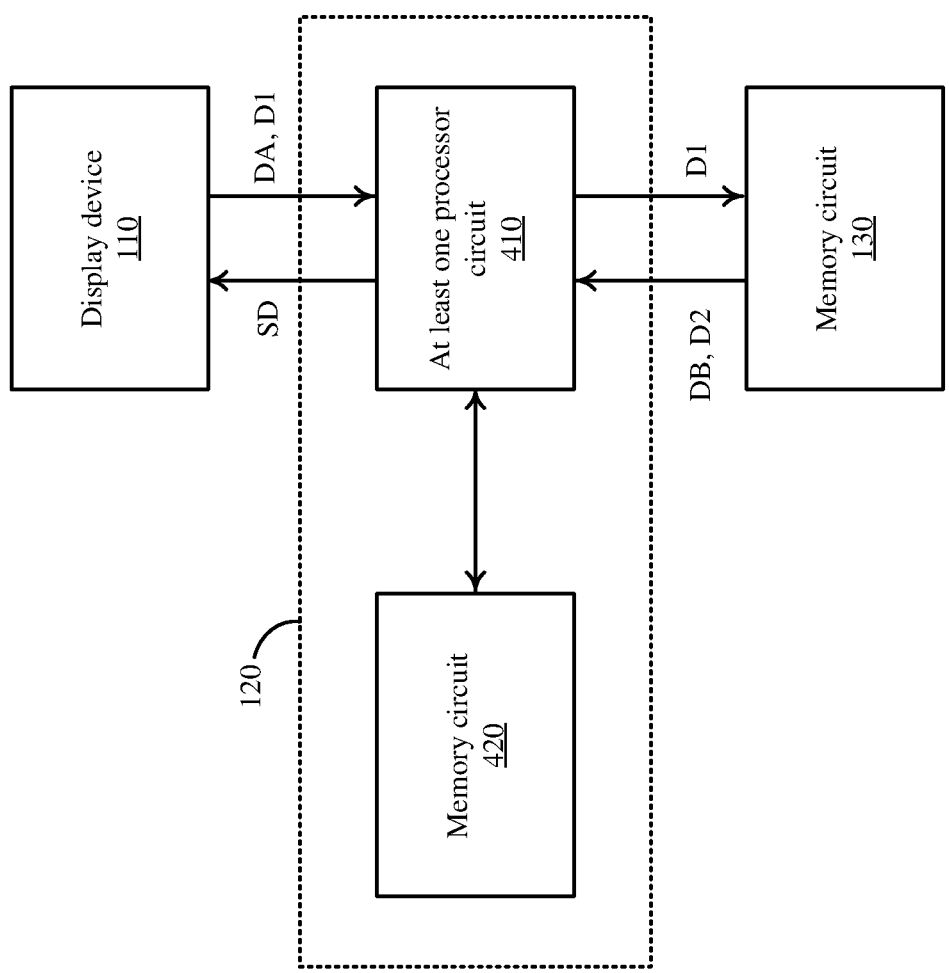
FIG. 4 is a schematic diagram of the image processor circuit in FIG. 1 according to some embodiments of the present disclosure.

FIG. 4 is a schematic diagram of the image processor circuit 120 in FIG. 1 according to some embodiments of the present disclosure. The image processor circuit 120 includes at least one processor circuit 410 and a memory circuit 420. The at least one processor circuit 410 may be at least one digital signal processing circuit for processing image(s), in order to generate the driving signal SD. For example, the at least one digital signal processing circuit may be, but not limited to, at least one of an image encoder circuit, an image decoder circuit, a scaler circuit, or a translator circuit. In some other embodiments, the at least one processor circuit 410 may be a central processing unit (CPU), an application-specific integrated circuit (ASIC), a multiprocessor, a pipeline processor, a distributed processing system, and/or an image processor circuit. The at least one processor circuit 410 may receive the predetermined data D1 and/or the part data DA from the display device 110, and receive the predetermined data D2 and/or the part data DB from the memory circuit 130 (i.e., operation S205, operation S215, operation S220, or operation S240 in FIG. 2). In some embodiments, if the predetermined data D1 is different from the predetermined data D2, the at least one processor circuit may transmit the predetermined data D1 to the memory circuit 130 (i.e., operation S235 in FIG. 2).

In some embodiments, the memory circuit 420 may operate as a data buffer to temporarily store various data generated when the at least one processor circuit 410 performs the panel driving method 200 in FIG. 2. In some embodiments, the memory circuit 420 stores at least one program code, which may be encoded with multiple instruction sets. The at least one processor circuit 410 may perform the at least one program code stored in the memory circuit 420, in order to perform operations in the panel driving method 200.

In some embodiments, the memory circuit 420 may be a non-transitory computer readable storage medium that is configured to store multiple executable instructions for performing operations in FIG. 2. In some embodiments, the computer readable medium may be, but not limited to, an electronic, magnetic, optical, electromagnetic, infrared, and/or a semiconductor device. For example, the computer readable storage medium includes a semiconductor or solid-state memory, a magnetic tape, a removable computer diskette, a random-access memory (RAM), a read-only memory (ROM), a rigid magnetic disk, and/or an optical disk.

As described above, the image display device, the image processor circuit, and the panel driving method in some embodiments of the present disclosure may bring up the time of the panel starting to display image(s). As a result, the user experience can be improved.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image display system, comprising:
   a display device comprising a panel and a first memory circuit, wherein the first memory circuit is configured to store first predetermined data for controlling the panel;
   a second memory circuit configured to store second predetermined data; and an image processor circuit configured to read first part data in the first predetermined data and second part data in the second predetermined data, and compare the first part data with the second part data, wherein the first part data is not the complete first predetermined data, the second part data is not the complete second predetermined data, and if the first part data is identical to the second part data, the image processor circuit is further configured to output a driving signal according to the second predetermined data to control the panel to start displaying an image.

2. The image display system of claim 1, wherein the first predetermined data comprises image compensation parameter data corresponding to the panel.

3. The image display system of claim 2, wherein the image compensation parameter data comprises at least one lookup table, and the at least one lookup table is for adjusting a plurality of pixel values of the panel.

4. The image display system of claim 2, wherein the image compensation parameter data comprises at least one lookup table, and the at least one lookup table is for adjusting a response time of the panel.

5. The image display system of claim 1, wherein a data transfer rate between the second memory circuit and the image processor circuit is faster than a data transfer rate between the first memory circuit and the image processor circuit.

6. The image display system of claim 1, wherein the first part data is error detection data.

7. The image display system of claim 6, wherein the error detection data comprises a checksum code or a cyclic redundancy check code.

8. The image display system of claim 1, wherein if the first part data is different from the second part data, the image processor circuit is further configured to read the complete first predetermined data and generate the driving signal according to the first predetermined data, and update the second predetermined data to be the first predetermined data.

9. The image display system of claim 1, wherein if the first part data is identical to the second part data, the image processor circuit is further configured to read the complete first predetermined data and the complete second predetermined data, and compare the first predetermined data with the second predetermined data, and if the first predetermined data is different from the second predetermined data, the image processor circuit is further configured to adjust the driving signal according to the first predetermined data, and update the second predetermined data in the second memory circuit to be the first predetermined data.

10. An image processor circuit, comprising:
a memory circuit configured to store at least one program code; and
at least one processor circuit configured to execute the at least one program code to:
read first part data in first predetermined data from a first memory circuit of a display device, and read second part data in second predetermined data from a second memory circuit;
compare the first part data with the second part data, wherein the first part data is not the complete first predetermined data, and the second part data is not the complete second predetermined data; and
if the first part data is identical to the second part data, output a driving signal according to the second predetermined data to control a panel of the display device to start displaying an image.

11. A panel driving method, comprising:
reading first part data in first predetermined data from a first memory circuit of a display device, and reading second part data in second predetermined data from a second memory circuit;
comparing the first part data with the second part data, wherein the first part data is not the complete first predetermined data, and the second part data is not the complete second predetermined data; and
if the first part data is identical to the second part data, outputting a driving signal according to the second predetermined data to control a panel of the display device to start displaying an image.

12. The panel driving method of claim 11, wherein the first predetermined data comprises image compensation parameter data corresponding to the panel.

13. The panel driving method of claim 12, wherein the image compensation parameter data comprises at least one lookup table, and the at least one lookup table is for adjusting a plurality of pixel values of the panel.

14. The panel driving method of claim 12, wherein the image compensation parameter data comprises at least one lookup table, and the at least one lookup table is for adjusting a response time of the panel.

15. The panel driving method of claim 11, wherein the first part data is error detection data.

16. The panel driving method of claim 15, wherein the error detection data comprises a checksum code or a cyclic redundancy check code.

17. The panel driving method of claim 11, further comprising:
if the first part data is different from the second part data, reading the complete first predetermined data and generating the driving signal according to the first predetermined data, and updating the second predetermined data to be the first predetermined data.

18. The panel driving method of claim 11, further comprising:
if the first part data is identical to the second part data, reading the complete first predetermined data and the complete second predetermined data;
comparing the first predetermined data with the second predetermined data; and
if the first predetermined data is different from the second predetermined data, adjusting the driving signal according to the first predetermined data, and updating the second predetermined data in the second memory circuit to be the first predetermined data.

* * * * *